US012035446B2

(12) United States Patent
Trice

(10) Patent No.: US 12,035,446 B2
(45) Date of Patent: Jul. 9, 2024

(54) MICROWAVE COOKING APPLIANCE WITH ARTICULATING BOTTOM

(71) Applicant: Midea Group Co., Ltd., Foshan (CN)

(72) Inventor: Daniel J. Trice, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 513 days.

(21) Appl. No.: 17/205,776

(22) Filed: Mar. 18, 2021

(65) Prior Publication Data

US 2022/0304120 A1 Sep. 22, 2022

(51) Int. Cl.

*H05B 6/64* (2006.01)
*F24C 7/02* (2006.01)
*F24C 15/02* (2006.01)
*H05B 6/78* (2006.01)

(52) U.S. Cl.

CPC ............. *H05B 6/6414* (2013.01); *F24C 7/02* (2013.01); *F24C 15/023* (2013.01); *H05B 6/6402* (2013.01)

(58) Field of Classification Search

CPC ........ G16B 20/00; G16B 20/20; G16B 20/40; G16B 30/00; A47J 36/027; F24C 15/168; F24C 7/02; H05B 6/6408; H05B 6/78

USPC ............... 219/739, 403, 404, 753, 762, 763; 126/334, 332, 339, 340, 337 R, 273 A, 126/190, 192, 37 B, 19 M

See application file for complete search history.

(56) References Cited

U.S. PATENT DOCUMENTS 3,343,904 A * 9/1967 Laug ........................ E06B 3/385 16/337
4,424,431 A 1/1984 Gurubatham
5,338,922 A 8/1994 Kim et al.
5,938,968 A 8/1999 Ogg et al.
6,073,624 A * 6/2000 Laurent ................. F24C 15/162 219/403
7,069,924 B2 7/2006 Kuttalek et al.
7,770,986 B1 8/2010 Simaitis
9,513,016 B2 12/2016 Martin
10,278,240 B2 4/2019 Ham et al.
2009/0321430 A1 12/2009 Jeong
2011/0084065 A1 4/2011 Gibson et al.
2011/0084067 A1 4/2011 Gibson et al.

(Continued)

FOREIGN PATENT DOCUMENTS

CN 1632381 A 6/2005
CN 101135465 A 3/2008

(Continued)

OTHER PUBLICATIONS

LG, Over the Range Microwave with EasyUp Door, LG Electronics, Retrieved from: https://www.lg.com/us/cooking-appliances/lg-LMVM2277-over-the-range-microwave, Retrieved on Mar. 18, 2021.

The Level Hot Pantry, The Level Oven, Retrieved from: https://level.ai/, Retrieved on Mar. 18, 2021.

Maytag, MMV5208WW Microwave Ovens-Over-the-Range, ABC Appliances, Retrieved from https://www.abcapplianceandtv.com/en/product/89814-maytag-mmv5208ww#89814_product_1, Retrieved on Nov. 4, 2020.

(Continued)

*Primary Examiner* — Quang T Van

(74) *Attorney, Agent, or Firm* — Gray Ice Higdon

(57) ABSTRACT

A microwave cooking appliance allowing better access into the cooking cavity. The microwave cooking appliance may include a bottom articulating from the housing. The appliance may include an actuator. The appliance may include one or more linkage members connected to the actuator and bottom. The appliance may include a linkage track guiding the one or more linkage members and/or bottom between positions.

21 Claims, 7 Drawing Sheets

(56) References Cited

U.S. PATENT DOCUMENTS

| | | | | |
|---|---|---|---|---|
| 2016/0374157 | A1* | 12/2016 | Ham | ..................... F24C 15/023 |
| 2019/0239295 | A1 | 8/2019 | Jang et al. | |
| 2019/0350407 | A1 | 11/2019 | Sharpe et al. | |

FOREIGN PATENT DOCUMENTS

| | | | |
|---|---|---|---|
| CN | 202868783 | U | 4/2013 |
| CN | 107490032 | A | 12/2017 |
| CN | 110953616 | A | 4/2020 |
| GB | 2271045 | A | 3/1994 |
| KR | 960005773 | B1 | 5/1996 |
| KR | 20010047058 | A | 6/2001 |

OTHER PUBLICATIONS

Related Applications Transmittal dated Jan. 16, 2024.

Van, Quang T., United States Patent and Trademark Office, Non-Final Office Action issued in U.S. Appl. No. 17/218,376, 24 pages, dated Nov. 21, 2023.

Canadian Patent Office, Examiner Requisition issued in Application No. 3,152,687, 3 pages, dated Feb. 5, 2024.

Canadian Patent Office, Examiner Requisition issued in Application No. 3,152,687, 4 pages, dated Mar. 21, 2023.

Van, Quang T., United States Patent and Trademark Office, Notice of Allowance issued in U.S. Appl. No. 17/218,376, 20 pages, dated Apr. 23, 2024.

* cited by examiner

MICROWAVE COOKING APPLIANCE WITH ARTICULATING BOTTOM

BACKGROUND

The present embodiments relate to a microwave cooking appliance integrated with an articulating bottom.

Typical microwave cooking appliances may have a fixed shaped opening and/or fixed height to access the contents of the cooking cavity. This potentially restricts the user's ability to access the contents. Thus, there is a need for articulating the bottom of the cooking appliance to allow better access to the contents of the cooking cavity.

SUMMARY

In some embodiments of the invention, for example, a microwave cooking appliance may include a housing having a cooking cavity, wherein the housing includes a front opening and a bottom opening. In various embodiments, the appliance may include a door. In some embodiments, the door may be movable between a closed position closing the front opening to define a portion of the cooking cavity and an open position different from the closed position. In various embodiments, the appliance may include a bottom. Moreover, in some embodiments, the bottom may be movable between a closed position closing the bottom opening to define a portion of the cooking cavity and an open positon different from the closed position. In various embodiments, the bottom may move from the closed position downwardly away from the bottom opening and outwardly in front of the front opening of the housing to the open position.

In some embodiments, the appliance may include a plurality of linkage members coupling the bottom to an actuator. In various embodiments, the actuator may articulate the plurality of linkage members from a stowed position to a deployed position, wherein when in the stowed position the bottom is in the closed position and when in the deployed position the bottom is in the open position. In some embodiments, the appliance may include one or more limit switches to verify the plurality of linkage members are in the stowed position and allows energization of the cooking cavity. In various embodiments, the appliance may include a linkage track guiding the articulation of the plurality of linkage members between the stowed position and the deployed position and the bottom between the closed position and the open position. In addition, in some embodiments, the housing may include a cavity and a fan, wherein the actuator, the linkage track, and/or the plurality of linkage members when in the stowed position may be positioned within the cavity, and wherein the fan is in fluid communication with the bottom through the cavity. In various embodiments, the linkage track may include a pin and slot engagement with the plurality of linkage members. Moreover, in some embodiments, the pin and slot engagement may include a straight slot and an arcuate slot. In various embodiments, the bottom may travel separately in a longitudinal direction and an arcuate direction between the closed position and the open position. In some embodiments, the front opening may be defined by an outer periphery, wherein the door seals against the outer periphery. In some embodiments, the bottom may include a portion of the outer periphery, wherein the portion of the outer periphery travels with the bottom between the closed position and the open position.

In various embodiments, a microwave cooking appliance may include a housing having a bottom opening and a front opening, wherein the front opening may be adjacent a front side of the housing. In some embodiments, the appliance may include a door positionable between a closed position and an open position relative to the front opening. In various embodiments, the appliance may include a bottom positionable between a closed position and an open position relative to the bottom opening. In some embodiments, the appliance may include an actuator. In addition, in various embodiments, the appliance may include a plurality of linkage members coupling the actuator to the bottom. In some embodiments, the actuator may articulate the plurality of linkage members from a stowed position to a deployed position. Moreover, in some embodiments, when in the stowed position the bottom may be in the closed position and when in the deployed position the bottom may be in the open position. In various embodiments, the appliance may include a linkage track guiding the plurality of linkage members between the stowed position and the deployed position to position the bottom from the closed position down and towards the front side of the housing to the open position.

In addition, in some embodiments, the linkage track may include a first slot and a second slot. Moreover, in some embodiments, the first slot may be substantially linear and the second slot may include an arcuate portion. In various embodiments, the plurality of linkage members may include a first linkage member having an upper end and a lower end. In some embodiments, the upper end may include a first pin slideably and rotatably engaging the first slot and a second pin slideably and rotatably engaging the second slot. In various embodiments, the lower end may include a third pin rotatably engaging the bottom. In some embodiments, the first linkage member may include an arcuate shape from the upper end towards the lower end, wherein the first linkage may be concave adjacent the front side of the housing. Moreover, in various embodiments, the first linkage member may pivot about the first pin when the first pin engages a lower end of the first slot and the second pin may slide in the arcuate portion of the second slot. In some embodiments, the first slot may be more proximal to the front side than the second slot, and wherein the arcuate portion of the second slot may extend below a lower end of the first slot. In various embodiments, the actuator may be a track actuator having a pivoting end attached to the housing and an attachment end pivotably attached to a linkage member of the plurality of linkage members. In some embodiments, the attachment end may linearly move relative to the pivoting end when the plurality of linkage members articulate between the stowed position and the deployed position. In various embodiments, when the door is in the closed position the door may overlap a front edge of the bottom when the bottom is in the closed position.

In some embodiments, a microwave cooking appliance may include a housing having a bottom opening and a front opening. In various embodiments, the front opening may be adjacent a front side of the housing. In some embodiments, the appliance may include a door positionable between a closed position and an open position relative to the front opening. In various embodiments, the appliance may include a bottom positionable between a closed position and an open position relative to the bottom opening. In some embodiments, the appliance may include a first seal positioned between the bottom and the housing when the bottom is in the closed position. In various embodiments, the appliance may include a second seal positioned between the door and the bottom when the bottom is in the closed position and the door is in the closed position.

In addition, in some embodiments, the first seal may be a gasket sealing a portion of a periphery of the bottom and/or the second seal may be a choke groove of the door sealing a remaining portion of the periphery of the bottom. In various embodiments, the front opening may be defined by an outer periphery, wherein the second seal seals against the outer periphery. In some embodiments, the bottom may include a portion of the outer periphery, wherein the portion of the outer periphery may travel with the bottom between the closed position and the open position. In various embodiments, at least a portion of the first seal may remain with the housing when the bottom travels between the closed position and the open position. In addition, in some embodiments, the second seal may travel with the door between the closed position and the open position.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
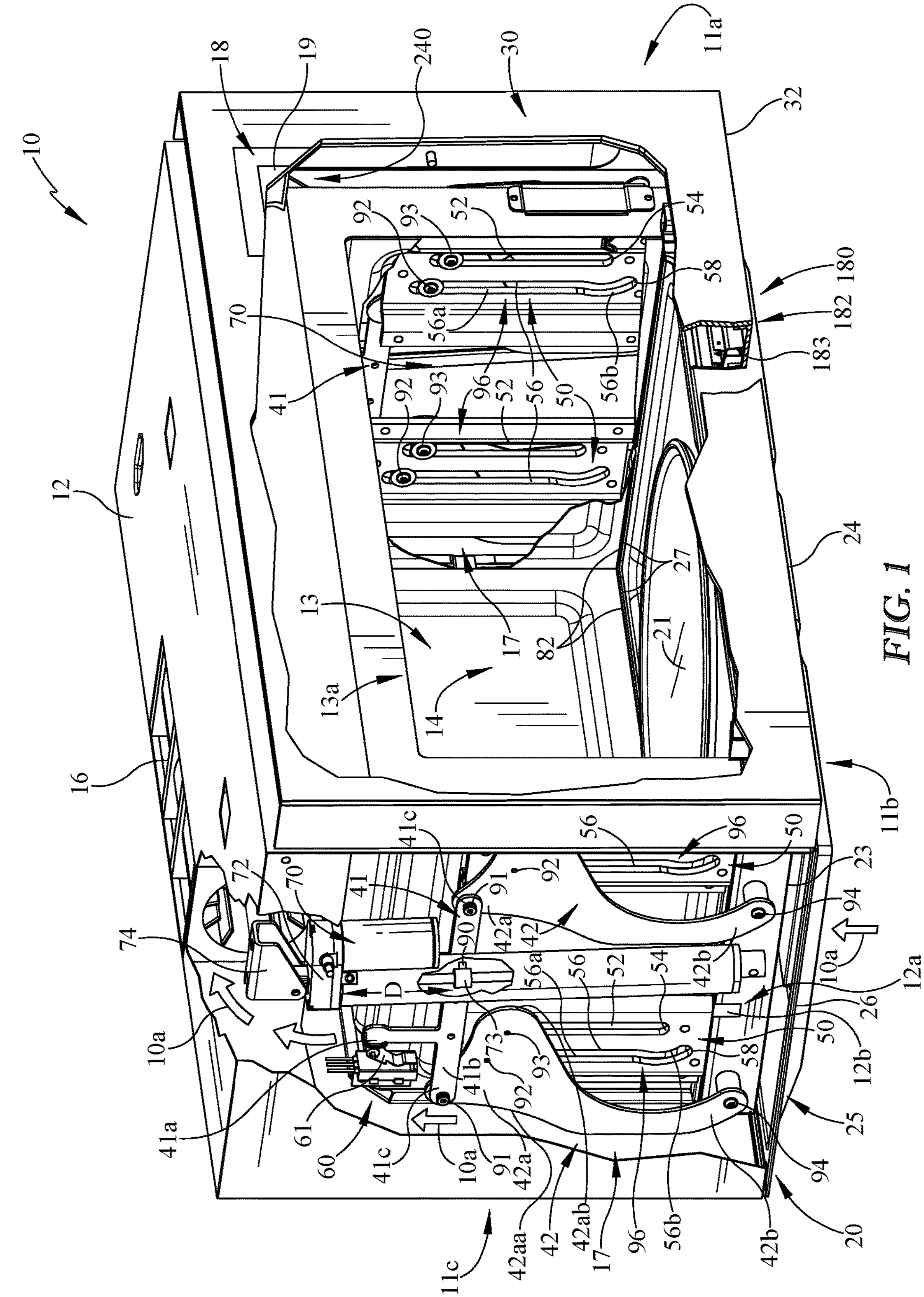
FIG. 1 is a perspective view of an embodiment of a microwave cooking appliance illustrating a door in the closed position, the linkage members in the stowed position, and one embodiment of an articulating bottom in the closed position.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a microwave cooking appliance, such as the type that may be used in single-family or multi-family dwellings, or in other similar applications. However, it will be appreciated that the herein-described techniques may also be used in connection with other types of microwave cooking appliances in some embodiments. For example, the herein-described techniques may be used in commercial or recreational vehicle applications in some embodiments.

Turning now to the drawings, wherein like numbers denote like parts throughout the several views, FIGS. 1-7 illustrate an example microwave cooking appliance 10 in which the various technologies and techniques described herein may be implemented. Microwave cooking appliance 10 is a residential-type microwave cooking appliance, and as such includes a housing or enclosure 12, which further includes a cooking cavity 14, as well as a bottom 20 and door 30 to form a portion of the cooking cavity 14. The door 30 may be disposed adjacent the respective front opening 13 of the cooking cavity 14 or housing 12. The bottom 20 may be disposed adjacent the respective bottom opening 15 of the cooking cavity 14 or housing 12. In various embodiments, the bottom may include a rotating turntable 21 and/or motor 22 driving the turntable 21. In some embodiments, the bottom 20 may include an air vent 23 in fluid communication with a fan 16. In various embodiments, the bottom 20 may include one or more light sources 24 to illuminate downwardly therefrom. In some embodiments, the bottom 20, or portions thereof, may articulate away from the bottom opening 15 and/or remaining cavity 14/housing 12/door 30, which are described in greater detailed herein. In some embodiments, the bottom 20 and/or door 30 may be linked/moved together, or separately, when positioned between their closed position and open position.

The microwave cooking appliance 10 may also include one or more user activated controls 18, which may be in the form of buttons, knobs, a touchscreen, or the like. In some embodiments, these user activated controls 18 may be used to program a cooking time and/or a cooking power level. In various embodiments, the controls 18 may open and/or close the door 30 and/or bottom 20 between one or more positions (e.g. open position, closed position, etc.). In some implementations, the bottom 20 and/or door 30 may include or/more handles 31 allowing the user to open and/or close the door/bottom or activate the opening/closing of the door/bottom. In addition, in some embodiments, these user activated controls 18 may be used to select one or more preset conditions for a particular food item to be cooked or a particular desired action (e.g. “popcorn”, “defrost”, “frozen pizza”, etc. The microwave cooking appliance 10 may also include a user interface display 19, which may be used to convey a variety of information to a user. For example, in some embodiments, the display 19 may be used to display the time when the microwave cooking appliance 10 is not in use. In other embodiments, the display 19 may be used to display cooking times, power levels, one or more positions of the door/bottom, and/or temperatures.

In some implementations, the appliance 10 may include one or more articulating bottoms 20. The bottom 20 may be positionable or movable between a closed position (FIGS. 1 and 5) and an open position (FIGS. 2, 3, 6, and 7). In the closed position, the bottom 20 may define a portion of the cooking cavity 14 and operably engage or close the bottom opening 15. In some embodiments, the bottom opening 15 may be defined by the door 30, or portions thereof (e.g. bottom edge 32, interior side 33, in the closed position, etc.) and the housing 12, or portions thereof (e.g. three bottom edges). In the open position, the bottom 20 is in a position different from the closed position. The bottom 20 may be articulated downwardly away (e.g. from the bottom opening 15) and laterally/outwardly (e.g. towards the user or in a direction towards the front side 11*a* of the appliance, in front of the front opening 13) from its closed position to the open position. This positions the bottom 20 at a lower height and closer to the user than when in the closed position when operating the cooking cavity 14. The user may be able to load and/or unload the contents positioned on the bottom 20 (e.g. turntable 21) when at the lower and more proximal position to the user when in the open positon. When in the open position, the bottom may be articulated downwardly and forward/outwardly (e.g. laterally offset from the closed position) in front of the door 30, front opening 13, and/or housing 12. In some implementations, the bottom may travel vertically/longitudinally up/down and laterally forward/backward between the closed and open positions. In the one embodiment shown, when the bottom 20 travels from the closed position to the open position, the bottom 20 moves downwardly in a substantially vertical and/or linear path/direction and then subsequently pivots/moves downwardly and/or laterally along an arcuate path/direction towards the user in a direction lateral/perpendicular to the vertical path. The bottom 20 remains in a substantially horizontal orientation when traveling between the open and closed positions. It should be understood the bottom may travel in a variety of directions and distances between the closed and open position.

In some implementations, the appliance may include one or more cavities or channels 17. The cavity 17 may be defined by one or more portions of the housing 12, bottom 20, and/or cooking cavity 14. The bottom 20 may include a housing 25. The bottom housing 25 may include laterally extending flange members 26 to close or dispose over the bottom of the cavities 17 on one or both lateral sides of the cooking cavity 14 when the bottom 20 is in the closed position. The cavity 17 within the housing 12 or appliance 10 may house the linkage members 40, linkage track 50, limit switch 60, and/or actuator 70. The bottom 20 (e.g. vent 23) may be in fluid communication with the one or more cavities 17 and/or fan 16 when in the closed position. The bottom may include the vent 23, if used, in fluid commination with the fan 16 through the one or more cavities 17. In the closed position, the bottom 20 (e.g. flange members 26) closes the cavity 17 bottom opening (e.g. exterior side walls of the housing and/or interior walls of housing/cooking cavity) outside the cooking cavity bottom opening portion to provide an airflow channel 10*a* between the bottom/vent and/or cooking cavity with the fan 16. The one or more linkage members 40, or portions thereof, are deployed from the bottom opening of the cavity 17 in the deployed position. The bottom housing 25 may include the light source 24, if used, on a bottom side thereof. The housing 25 may include a motor 22, if used, rotatably driving the turntable 21, if used, of the bottom 20.

In some embodiments, the microwave cooking appliance 10 may include a variety of connections 12*a* in communication with the bottom 20 and/or the remainder of the housing 12/door 30 or portions of the appliance 10. As shown in the one embodiment, the bottom 20 (e.g. light, turntable, etc.) may be powered and/or connected by one or more connections 12*a* (e.g. contact pins 12*b*) to one or more portions or components of the appliance 10 (e.g. controls 18, electrical, power). The bottom 20 may include one or more contact pins 12*b* that correspond to one or more contact pins 12*b* with the remaining portion of the housing 12 or door 30. When the bottom 20 is in the closed position (FIG. 1), the one or more contact pins 12*b* of the bottom 20 and remaining portion of the housing 12 engage each other to enable communication (e.g. electrical) between the appliance/bottom, or portions thereof. When the door is in the open position (FIGS. 2 and 3), the one or more contact pins 12*b* are disengaged from each other and may place one or more components of the appliance/bottom out of communication with each other. In some embodiments, one or more wires, if used, may connect the controls 18 and/or bottom 20 alone or in combination with the contact pin engagement, if used.

In some implementations, the appliance 10 and/or bottom 20 may include one or more sealing systems 80, 180 between the bottom 20 and the remainder of the housing 12 and/or door 30 when both are in the closed position to capture or shield microwave leakage. As shown in the one embodiment, the sealing system 80 may include a first seal or gasket 82. The first seal or gasket 82, if used, may be an electroseal conductive elastomer gasket conductively in some embodiments. The first gasket 82 may extend about the entire periphery or portion of the periphery 15*a* of the bottom opening 15 of the housing 12 and/or cooking cavity 14. In some embodiments, the bottom opening may be defined by an outer periphery 15*a* (e.g. three sides of the housing bottom side 11*b* and the interior side 33 of the door). As shown in the one embodiment, the gasket 82 may extend along three sides of the bottom side 11*b* or outer periphery 15*a* of the bottom opening 15 or cooking cavity 14. The gasket 82 extends along the lateral sides and the rear side of the housing or bottom side/periphery 15*a*. The first gasket 82 may engage three sides of a top surface/periphery of the bottom 20 (e.g. groove 27, cooking cavity portion of the bottom) when the bottom is in the closed position. Although not shown, the first seal, or portions thereof, may be attached to and move with the bottom alone or in combination with the seal on the housing/door.

In some embodiments, the cooking cavity 14 may be sealed by a plurality of sealing system. As shown in the one embodiment, the sealing system 180, if used, may include a second seal 182 between the door 30 and the front opening 13/bottom 20. The front opening 13 may be defined by an outer periphery 13*a*. The door may seal against the outer periphery 13*a*. The outer periphery 13*a* may be three sides of the front side 11*a* of the housing 12 and a portion of the bottom 20 (e.g. front side or edge 25*a* of the bottom). The bottom portion (e.g. front side 25*a*) of the outer periphery 13*a* defining the front opening 13 may travel with the bottom 20 between the closed and open position. The door 30/second seal 182 (e.g. choke groove 183) may cover or overlap (e.g. vertically) the bottom front side/edge 25*a* when in the closed position as shown in FIG. 1. The second seal or gasket 182 may capture or shield microwave leakage when positioned between the door 30 and the remainder of the housing 12 and/or bottom 20 when both the door and/or bottom are in the closed position. The second seal 182 may include the choke groove 183 of the door 30. The choke groove 183 of the door, if used, may capture microwaves along the front edge or side 25*a*/periphery 13*a* of the bottom 20/housing 12 (e.g. not having the first seal 82) when the door is in the closed position. The second seal 182 (e.g. choke groove 183) or door 30 may be used in combination with first seal 82 to capture the microwaves when the door and bottom are in the closed position. The choke groove may be positioned along the outer periphery of the door (e.g. frame).

Figure 3:
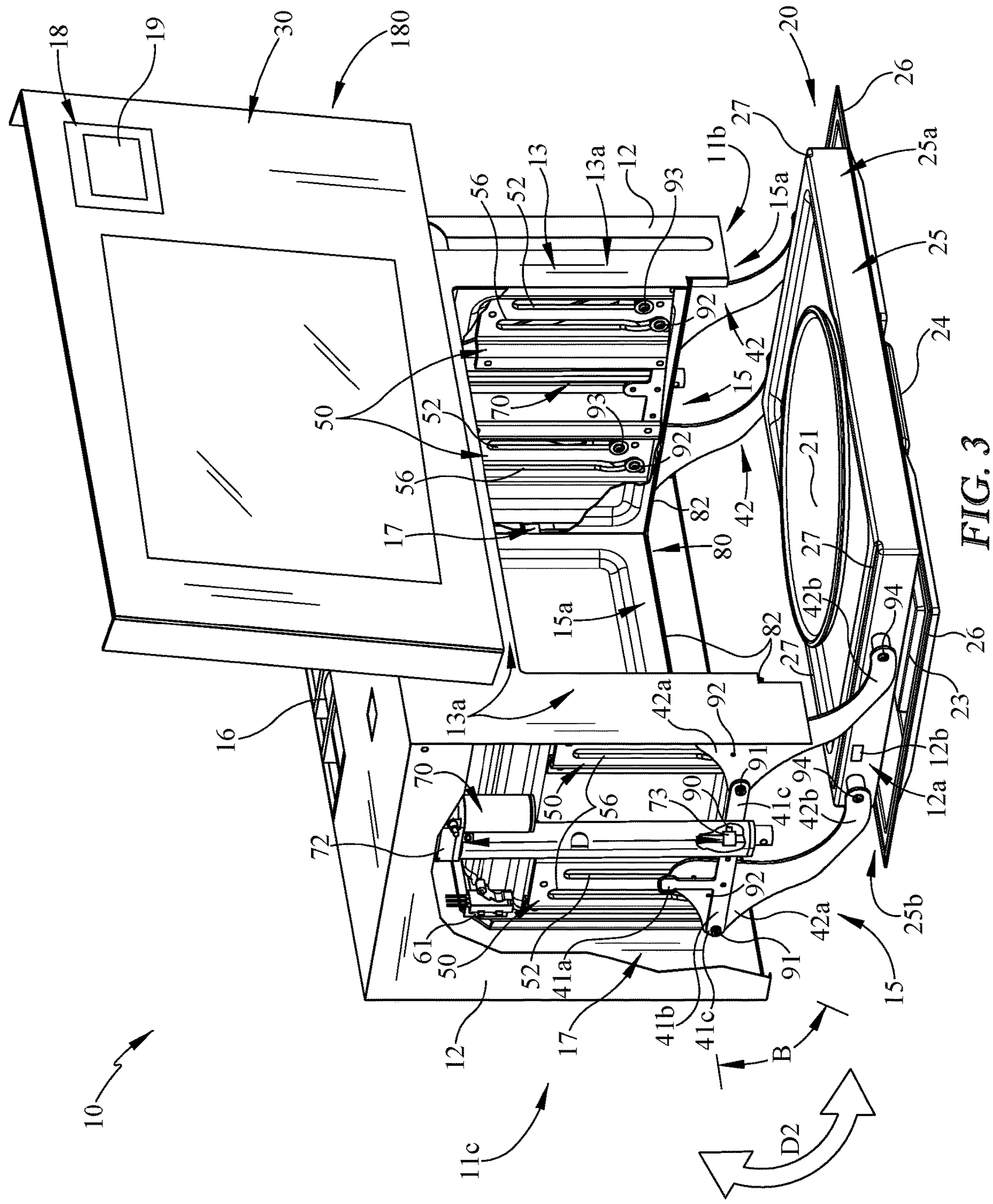
FIG. 3 is a perspective view of the microwave cooking appliance of FIG. 1 illustrating the door and the bottom in an open or fully open position and the linkage members in the deployed position after arcuate and/or pivoting movement of the bottom downwardly and/or forward of the cooking appliance towards the user, and illustrating the pin and slot engagement after arcuate and/or pivoting movement of the bottom.
Figure 4:
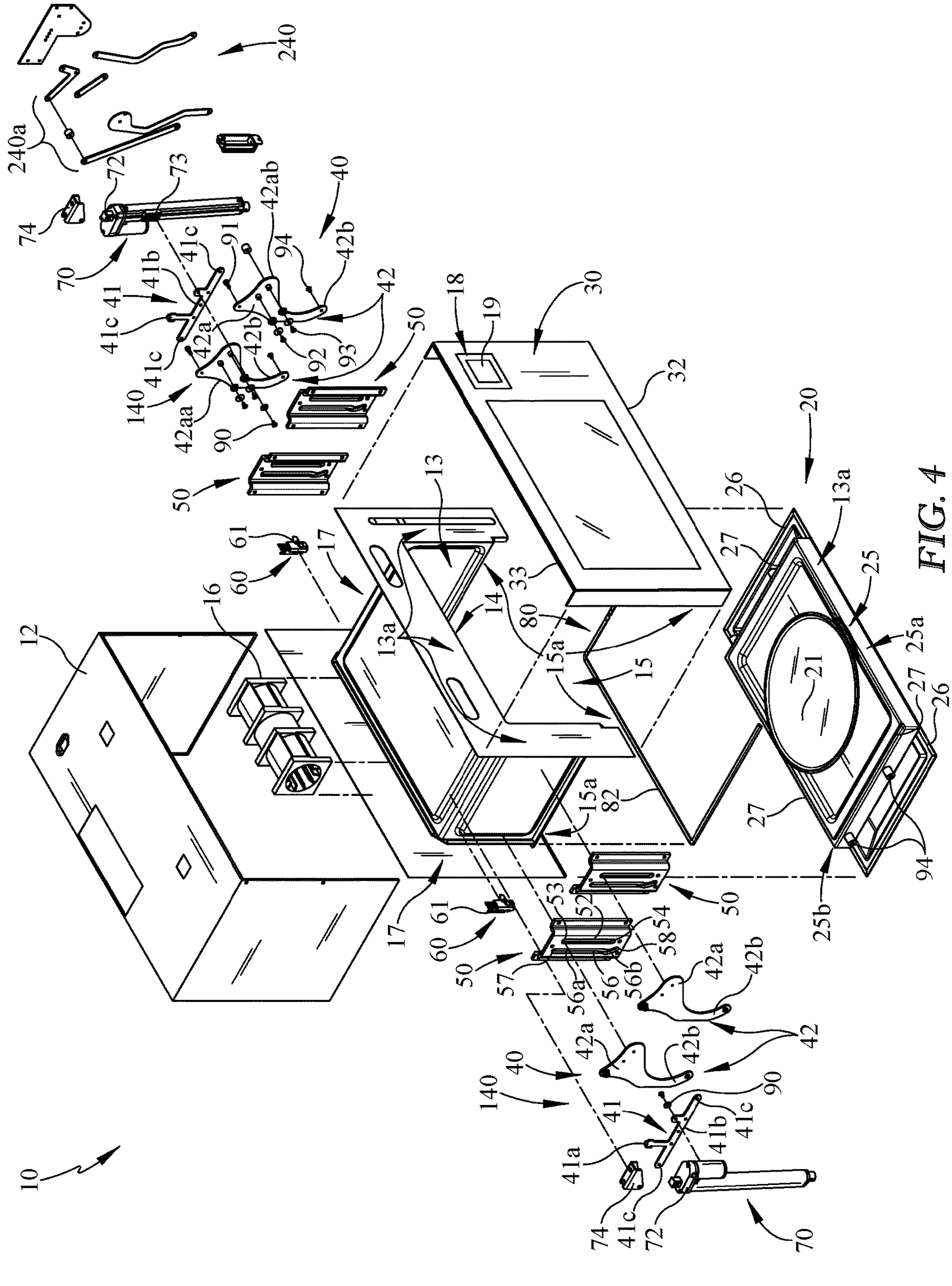
FIG. 4 is an exploded view of the microwave cooking appliance of FIG. 1.

In some implementations, the front opening 13 and bottom opening 15 may be described as intersecting. When both the door 30 and bottom 20 are in the open position as shown in FIG. 3, the front opening 13 and the bottom opening 15 may have one side discontinuous or open to the adjacent opening. For example, the opening 13, 15 may not have the outer periphery 13*a*, 15*a* defining their respective opening when the door and bottom are in the open position. For example in some implementations, when the door 30 is in the open position and the bottom 20 is in the closed position, the front opening 13 may have a complete outer periphery 13*a* (e.g. defined by the bottom 20 and the housing 12). In some implementations, when the door 30 is in the closed position and the bottom 20 is in the open position, the bottom opening 15 may have a complete outer periphery 15*a* (e.g. defined by the door 30 and the housing 12).

Figure 2:
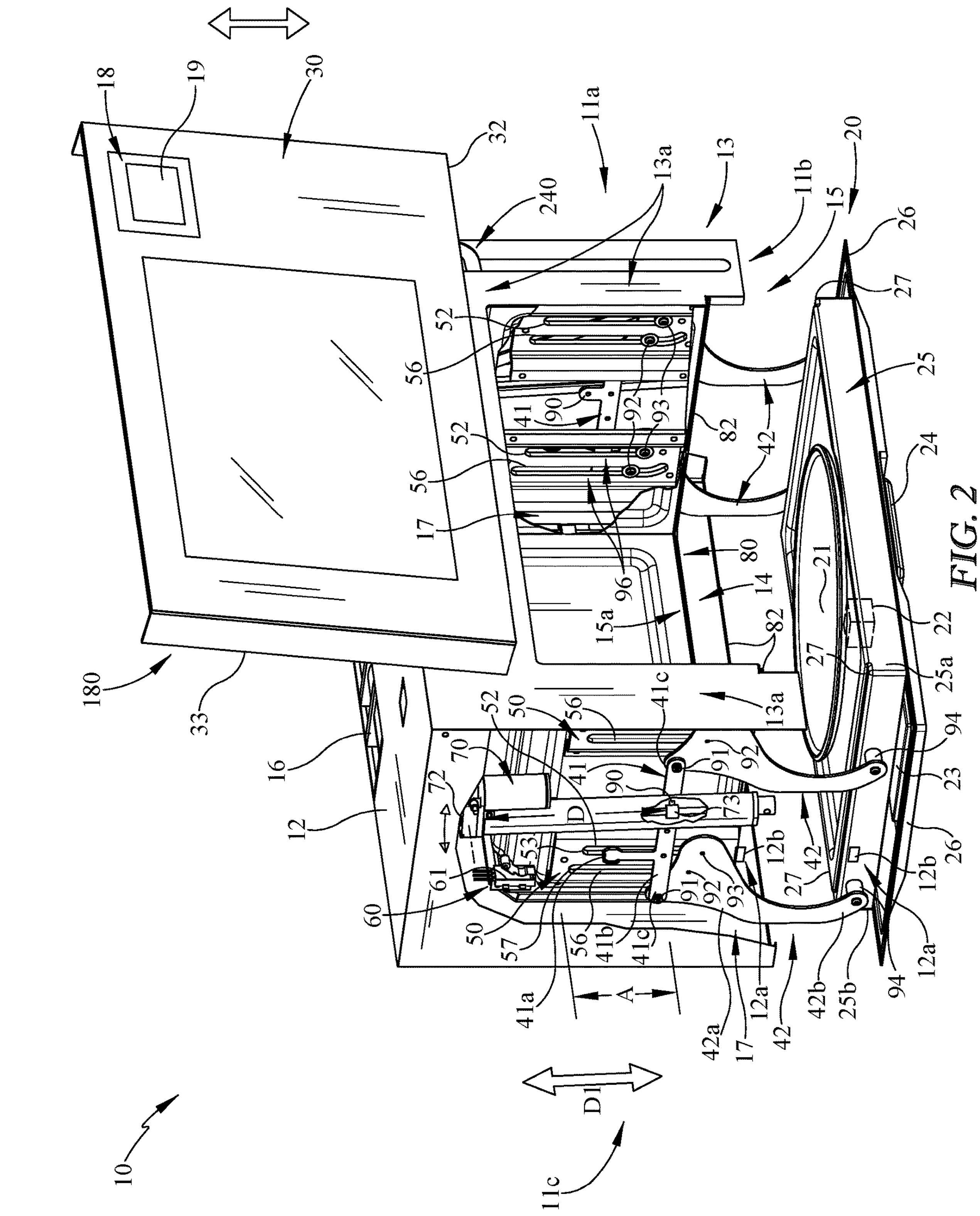
FIG. 2 is a perspective view of the microwave cooking appliance of FIG. 1 illustrating the door and the bottom in an open position and the linkage members in the deployed position after linear and/or downward travel of the bottom, and illustrating a pin and slot engagement before arcuate and/or pivoting movement of the bottom.

In some implementations, the appliance 10 may include one or more position verification devices 60 to indicate the bottom 20, door 30, or portions of the appliance 10 (e.g. linkage member(s) 40, actuator 70, surfaces, seal/gasket 80, 180, etc.) are in one or more particular positions (e.g. closed, open, deployed, and/or stowed position). For example, when the bottom 20 and/or door 30 are in the closed position the verification device 60 may allow energization of the microwave cooking appliance 10 (e.g. cooking cavity). In some implementations, the one or more verification devices 60 may be a limit switch 61. The one or more limit switches 61 may indicate that the bottom 20 and/or door 30 is in the closed and/or locked position to allow energization or other operations of the appliance. The limit switch 61, if used, may be positioned in one or both cavities 17. When two limit switches 61 are used in the lateral cavities 17, as shown in the one embodiment, each lateral side of the bottom 20 may be verified to be in the open/closed position. The one or more limit switches 61 may verify the one or more linkage members 40 are in the stowed position. As shown in FIGS. 2 and 3, when the one or more limit switches 61 is disengaged from the linkage members (e.g. deployed position) or the bottom is in the open position, the Magnetron is disengaged and does not allow energization. As shown in FIG. 1, when the one or more limit switches 61 is engaged from the linkage members (e.g. stowed position) or the bottom is in the closed position, the Magnetron is engaged and allows energization. Although the limit switch is operably contacting a linkage member when in the closed or stowed position, the limit switch may be use in operation or operable contact with one or more linkage members (e.g. first, second, etc.), actuator, bottom, and/or door, or portions of the housing/appliance.

In some implementations, the appliance 10 may include one or more actuators 70 articulating the bottom 20 and/or door 30, or portion of the appliance (e.g. linkage member(s) 40/140/240, actuator 70, pins 90-94, etc.) between two or more positions (e.g. closed, open, deployed, stowed). The actuator 70, if used, may articulate the bottom 20 and/or door 30 in various embodiments. The actuator, if used, may actuate a plurality of first linkage members 140 connected to the bottom 20 between a stowed position and a deployed position. The actuator, if used, may actuate a plurality of second linkage members 240 connected to the door 30 between a stowed position and a deployed position. Although the actuator 70 is shown articulating both the bottom 20 and the door 30 (e.g. connected by a plurality of linkage members), it should be understood that the actuator may only articulate the bottom 20 in some embodiments. In some embodiments, a first actuator may articulate the bottom and a second actuator may articulate the door. In the one embodiment shown, the actuator 70 may be a linear and/or track actuator. The actuator 70 may be positioned in the cavity 17. The actuator 70 may be coupled to the bottom 20 and/or door 30 with one or more linkage members 40 and/or one or more linkage tracks 50. The actuator 70 may move or articulate the one or more linkage members 40 between the stowed position and the deployed position. In some embodiments, the actuator 70 may have a first or pivoting end 72 attached to the appliance 10 (e.g. housing, cavity, bracket, etc.) and a second or attachment end 73. The attachment end 73 may be pivotably attached or coupled to one or more linkage members 40 (e.g. first). The attachment end 73 and/or linkage member 40 (e.g. first) may move between a variety of positions for a distance D relative to the pivoting end 72. The attachment end 73 may extend in a linear direction for the distance D away from the pivoting end 72 when the one or more linkage members 40 articulate between the stowed positon and the deployed position. The actuator 70 may pivot about the pivoting end 72 and/or the attachment end 73 when articulating the linkage members 40 and/or bottom 20 between the stowed/deployed positions and the closed/open position and/or when changing the distance D between the pivoting end 72 and the attachment end 73. As shown in the one embodiment, the pivoting end 72 of the actuator 70 may be pivotably attached to a bracket 74/housing 12/cavity wall 17 and the attachment end 73 may be pivotably attached or coupled to the linkage member(s) 40 (e.g. first). Alternatively or in combination with an actuator, if used, in some embodiments the user may articulate the bottom and/or door manually.

In some implementations, the appliance may include one or more obstacle detection systems, if used, to reduce undesirable contact with the moveable bottom coming into contact with obstacles (e.g. below the microwave housing or bottom when in the closed position moving to the open position). One embodiment of the obstacle detection system may be the actuator or motor 70. The actuator may reverse in direction upon contact or interference with an obstacle based upon one or more current levels reached. It should be understood that a variety of sensors (e.g. optical, IR) may be used in some embodiments of the obstacle detection system.

In some implementations, the appliance 10 may include one or more linkage members 40 articulating between a stowed position and a deployed position. The deployed positon being different from the stowed position. The stowed position may position the one or more linkage members 40, or portions thereof, within the cavity 17 thereby positioning the bottom in the closed position. The deployed position may position the one or more linkage members 40, or portions thereof, out of the cavity 17 thereby positioning the bottom 20 in the open position. The actuator 70 may articulate the plurality of linkage members 40 between the stowed and deployed positions. As shown in the one embodiment, the lateral sides of the bottom/housing may each have a set of the first plurality of linkage members 140 connecting the housing/actuator to the bottom. It should be understood that one lateral side/cavity 17 may include the linkage members 140, 240 or be in a variety of positions. A second plurality of linkage members 240 may be connected to a first plurality of linkage member(s) 140 coupled between the bottom 20 and the actuator 70 as shown, or may be separate therefrom in various embodiments. For example, the second plurality of linkage members 240 coupled to the door 30 and the first plurality of linkage members 140 is present on one side of the housing/cavity and not the other. However, both sides or cavities 17 may include the second plurality of linkage members 240 (e.g. 240*a*). The appliance may have similar or different components on each side of the housing/bottom.

For ease of understanding, the articulating mechanism positioned on or attached to one side of the bottom 20 with the actuator 70 will be described. In some implementations, the first plurality of linkage members 140 (e.g. linkage members 40) may include one or more first linkage members 41 coupled to one or more second linkage members 42. A first linkage member 41 may be attached to the translationally moving or attachment end 73 of the actuator 70. The first linkage member 41 may maintain a substantially horizontal orientation when articulating between the stowed and deployed positions. The first linkage member 41 may include tab 41*a* (e.g. upwardly extending) from the elongated horizontal member 41*b* to operably engage/disengage the limit switch 61 between positons. The first linkage member 41 includes an elongated member 41*b* with a first/pivoting pin or engagement 90 with the attachment end 73 of the actuator 70 positioned between or spaced away from two opposing ends 41*c*. The opposing ends 41*c* of the first linkage member 41 are coupled to the one or more second linkage members 42 (e.g. a pair of linkage members). A second/pivoting pin or engagement 91 at each opposing end 41*c* engages or couples to the upper end 42*a* and/or back end/side 42*aa* of each the second linkage member 42, respectively. When in the stowed position, the second pin 91 is at a higher elevation than a third/pivoting pin or engagement 92 and fourth/pivoting pin or engagement 93 adjacent the upper end 42*a* of the second linkage member 42 and decreasing in elevation from the back end/side 42*aa* towards the front end/side 42*ab* of the second linkage member upper end 42*a* or housing front side 11*a*. Each one of the second linkage members 42 (e.g. rear and front linkage member) may include a fifth/pivoting pin or engagement 94 adjacent the lower end 42*b* of the second linkage member 42. The fifth pin 94 of the rear second linkage member may be coupled to the lateral side of the bottom adjacent the rear edge 25*b* and front edge 25*a* (e.g. above the flange member 26, adjacent the cooking cavity portion of the bottom). As shown in the one embodiment, the second linkage member 42 may be arcuate or curved in shape between the upper end 42*a* and the lower end 42*b*. Each second linkage member 42 may be concave in shape when viewed from or adjacent the front side 11*a* of the housing 12 towards the rear side 11*c* of the housing 12. When the second linkage member 42 is in the stowed position and the bottom 20 is in the closed position as shown in FIG. 1, the upper end 42*a* of the second linkage member 42 and/or the second, third, and fourth pins 91, 92, and 93 may be positioned forward of the lower end 42*b* and/or fifth pin 94 of the second linkage member 42. When the second linkage member 42 is in the deployed position and the bottom 20 is in the open position as shown in FIG. 3, the upper end 42*a* of the second linkage member 42 and/or the second, third, and fourth pins 91, 92, and 93 may be positioned rearward of the lower end 42*b* and/or fifth pin 94 of the second linkage member 42. Further, when the second linkage member 42 is in in the deployed position and the bottom 20 is in the open position as shown in FIG. 3, the second pin 91 is at a lower elevation than the third pin 92 and fourth pin 93 increasing in elevation from the from the rear side towards the front side of the housing. The pin or engagements, or portions thereof, may be a variety of sizes, shapes, quantities, materials, positions within the linkage(s), and construction and still be within the scope of the invention. The pins may allow for sliding, pivoting, and/or rotating engagements between members or portions of the appliance. For example, the pin may include a bearing or bearing surfaces.

In some implementations, the plurality of linkage members 40 (e.g. first 41, second 42, etc.) may articulate between the stowed position wherein the bottom 20 is in the closed positon and the deployed position wherein the bottom 20 is in the open position. In various embodiments, the second linkage members 42, first linkage member 41, and/or bottom 20 may articulate in more than one direction or path between the deployed/open position and the stowed/closed position. In the one embodiment shown in FIG. 2, the first linkage members 41, second linkage members 42, and the bottom 20 travel in a first direction D1 (e.g. linear, longitudinal, vertical direction) down. Then, as shown in FIG. 3, in a second direction D2 (e.g. arcuate, pivoted about an axis or pin 93, forward) outwardly towards the front side 11*a*/opening 13 (e.g. in front of the opening 13) and/or user when deploying to the deployed position. The bottom 20 and/or linkage member(s) 40 may separately travel first in the longitudinal/vertical direction D1 (e.g. linearly) and secondly in the arcuate direction D2 (e.g. about a pivot/hinge/pin) when traveling from the closed/stowed position to the open/deployed position.

In some implementations, the appliance 10 may include one or more linkage tracks or guides 50. The one or more linkage tracks may guide the articulation of the plurality of linkage members between the stowed position and the deployed position and the bottom between the closed position and the open position. In the one embodiment shown, a pair of linkage tracks 50 may be used with the linkage members 40 on each of the lateral sides of the bottom 20/housing 12. The linkage track 50 may be fixed within the cavity 17 or housing 12. The linkage track 50 may include a plurality of slots 52, 56 to guide the bottom 20, linkage members 40, and/or pins 90-94 between positions (e.g. stowed, deployed). The linkage track 50 may include a first, straight, or front slot 52 and a second, arcuate, or rear slot 56 engaging one or more pins 91, 92 of the linkage members (e.g. second). The first slot 52 may be different from the second slot 56 as shown in the one embodiment. The first slot 52 may be substantially linear. The first slot 52 may be positioned proximal or adjacent the front opening 13/side 11*a* of the housing 12 or appliance 10. The first slot 52 may be more proximal the front side 11*a* than the second slot 56. The second slot 56 may include a linear portion 56*a* positioned above an arcuate portion 56*b*. The second slot 56 may be positioned proximal or adjacent the rear side 11*c* of the housing 12 or appliance 10. The second slot 56 may be longer than the first slot 52. The second slot 56 (e.g. upper end or extent 57) may extend above the first slot 52 (e.g. upper end or extent 53) and/or the second slot 56 (e.g. lower end or extent 58) may extent below the first slot 52 (e.g. lower end or extent 54). The arcuate portion 56*b*, or portion thereof, of the second slot 56 may extend lower than the lower end or extent 54 of the first slot 52. The arcuate portion 56*b*, or portion thereof, of the second slot 56 may extend above the lower end or extent 54 of the first slot 52 to below the lower end 54 of the first slot 52. The arcuate portion 56*b* of the second slot 56 may be concave proximate the front side 11*a*/opening 13. The arcuate portion 56*b* may be positioned at a radial distance about the lower end 54 of the first slot 52.

In some implementations, the appliance may include one or more pin and slot engagements 96. The linkage track 50 and the linkage member(s) (e.g. second linkage member 42) may include one or more pin and slot engagement 96 therebetween to articulate the bottom 20, actuator 70, and/or linkage members 40. The pin and slot engagement 96 may include the slots (e.g. first slot 52, second slot 56, etc.) of the linkage track 50 and the pins (e.g. third pin 92, fourth pin 93, etc.) of the second linkage member 42. The fourth pin 93 may slideably and/or rotatably engage the first slot 52. The third pin 92 may slideably and/or rotatably engage the second slot 56. From the closed/stowed position to the open position, both the third and fourth pin 92, 93 slide together (e.g. in parallel) within their respective slot 52, 56 from the upper end 53, 57 towards the lower end 54, 58 along the linear or longitudinal direction D1 for a first distance A, wherein the first linkage 41, second linkage 42, and the bottom 20 linearly travel in the longitudinal/axial direction. Upon traveling for the first distance A and the fourth pin 93 engages the lower end 54 of the first slot 52, the third pin 92 continues to slide downwardly and arcuately along the arcuate portion 56*b* of the second slot 56 for a second distance B in the second direction D2 to the deployed/open position of the bottom, first linkage, and second linkage. With the third pin 92 sliding and/or pivoting about the pivot point or fourth pin 93 in the first slot 52 (e.g. lower end 54), the bottom 20, second linkage 42, lower end 42*b*, first pin 90, pivot end 72, actuator 70, and the first linkage 41 also pivot along one or more arcuate paths towards the deployed/open position. It is understood that the travel or path would be reverse from the deployed/open position to the stowed/closed position. Alternatively, the return path to the closed position may be different in some embodiments.

Figure 5:
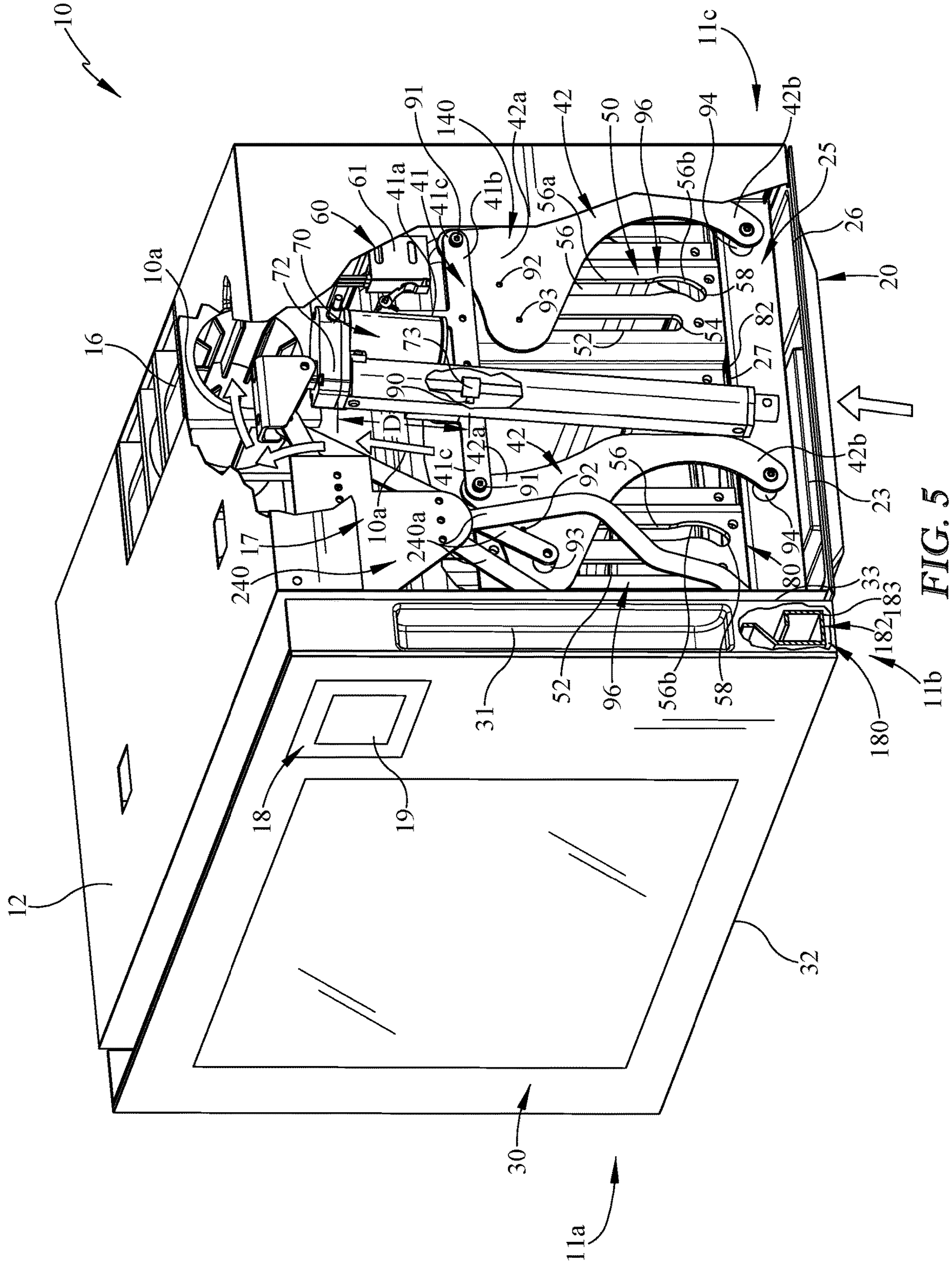
FIG. 5 is another perspective view of the embodiment of the microwave cooking appliance of FIG. 1 illustrating the door in the closed position, the linkage members in the stowed position, and the articulating bottom in the closed position.
Figure 6:
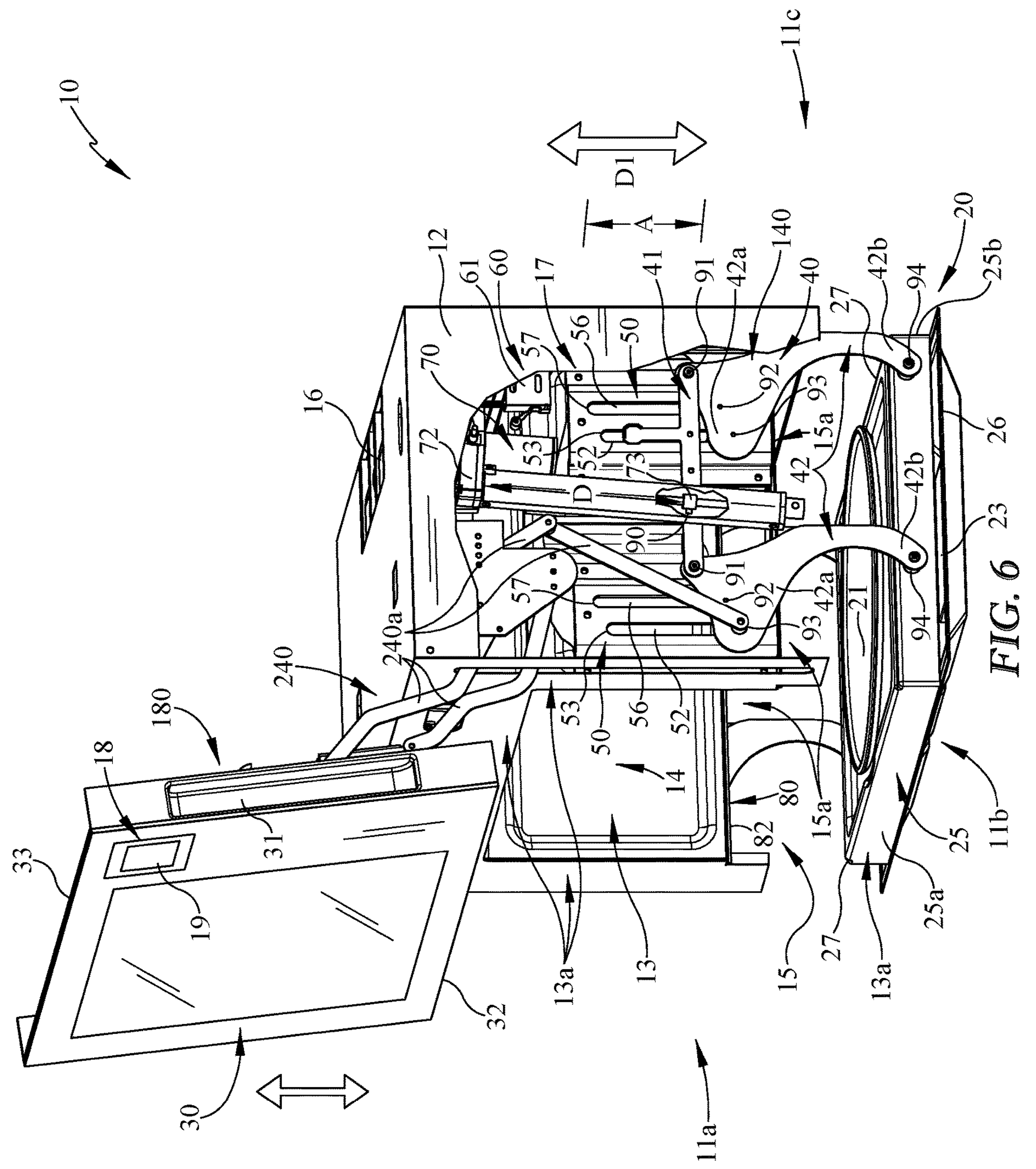
FIG. 6 is a perspective view of the microwave cooking appliance of FIG. 5 illustrating the door and the bottom in an open position and the linkage members in the deployed position after linear and/or downward travel of the bottom, and illustrating a pin and slot engagement before arcuate and/or pivoting movement of the bottom.
Figure 7:
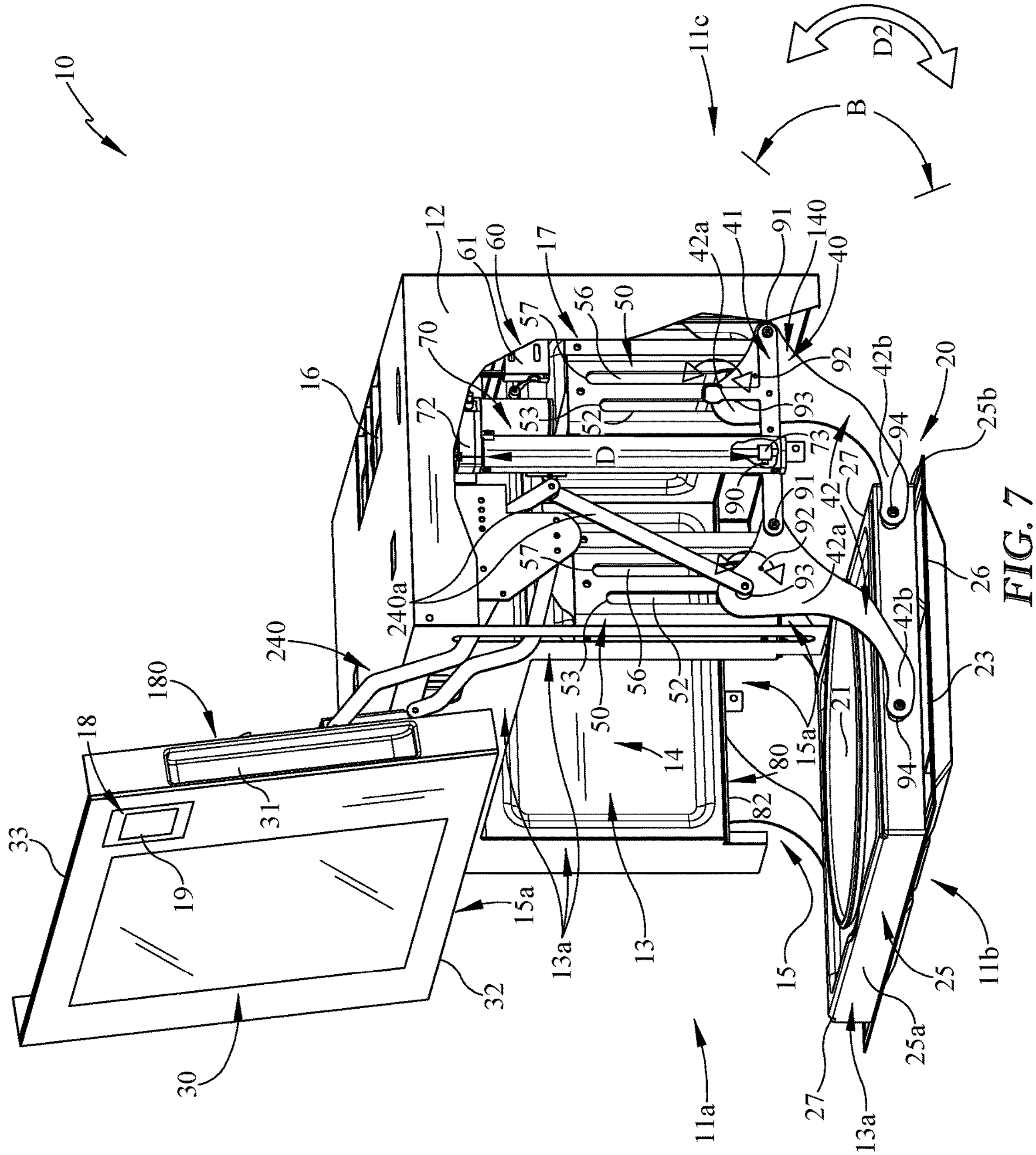
FIG. 7 is a perspective view of the microwave cooking appliance of FIG. 5 illustrating the door and the bottom in an open or fully open position and the linkage members in the deployed position after arcuate and/or pivoting movement of the bottom downwardly and/or forward of the cooking appliance towards the user, and illustrating the pin and slot engagement after arcuate and/or pivoting movement of the bottom.

In some implementations, the appliance may include a door (e.g. front) postionable between the closed position with the front opening and an open position. In the closed position as shown in FIGS. 1 and 5, the door 30 may close the front opening 13 and define a portion of the cooking cavity 14. Although the door is shown as using linkage members 240*a* (e.g. second plurality/set 240) connected through the front side 11*a* (e.g. slotted opening in the periphery of the opening 13) of the housing 12 to the linkage members 40 (e.g. first set/plurality 140) coupling the bottom 20 to the actuator 70, it should be understood that the door 30 may use linkage members separate from the first plurality of linkage members 140 and still be in scope of the invention. The second plurality of linkage members 240 moves the door upwardly and away from the cooking cavity 14, housing 12, or front opening 13 towards the user in the one embodiment shown. The second plurality of linkage members 240, if used, may be operated by the actuator, another/different actuator, or manually operated. In various embodiments, the door may be hinged.

It should be understood that the bottom 20, door 30, cavity 17, actuator 70, linkage member(s) 40, 240*a*, pin and slot engagements, and/or linkage track 50 may be a variety of sizes, shapes, materials, positions, quantities, and constructions, and still be within the scope of the invention. For example, the door may be hinged instead of connected to the housing/first linkage members/bottom. Further, the bottom may be manually operated in some embodiments.

In use, the user may open/close the door 30 and the bottom 20 at the same time as shown in the figures. The articulation of the bottom 20, door 30, and/or linkage members 40 and/or 240*a* between positions may be activate by the user via the controls, sensors, or manually engaging the door/bottom. For example, opening the door opens the bottom, or vice versa. Further, closing the door closes the bottom, or vice versa. In some embodiments, the door and the bottom may be separately activated to open/close. For example, the user could open the door without opening the bottom. Then the user could choose to open the bottom relative to the housing if and when desired to load and/or unload contents. Further, for example, the user could close the door without closing the bottom. It should be understood that a variety of sequences and methods of articulating the bottom relative to the door could be used to access the contents or cooking cavity of the appliance.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A microwave cooking appliance comprising:

a housing having a cooking cavity, wherein the housing includes a front opening and a bottom opening;

a door, wherein the door is movable between a closed position closing the front opening to define a portion of the cooking cavity and an open position different from the closed position;

a bottom, wherein the bottom is movable between a closed position closing the bottom opening to define a portion of the cooking cavity and an open position different from the closed position, wherein the bottom moves from the closed position downwardly away from the bottom opening and outwardly in front of the front opening of the housing to the open position;

a plurality of linkage members coupling the bottom to an actuator, wherein the actuator articulates the plurality of linkage members from a stowed position to a deployed position, wherein when in the stowed position the bottom is in the closed position and when in the deployed position the bottom is in the open position; and a linkage track guiding the articulation of the plurality of linkage members between the stowed position and the deployed position and the bottom between the closed position and the open position, wherein the linkage track includes a pin and slot engagement with the plurality of linkage members, wherein the pin and slot engagement includes a straight slot and an arcuate slot.

2. The microwave cooking appliance of claim 1 further comprising one or more limit switches to verify the plurality of linkage members are in the stowed position and allows energization of the cooking cavity.

3. The microwave cooking appliance of claim 1 wherein the housing includes a cavity and a fan, wherein the actuator, the linkage track, and the plurality of linkage members when in the stowed position is positioned within the cavity, and wherein the fan is in fluid communication with the bottom through the cavity.

4. The microwave cooking appliance of claim 1 wherein the bottom travels separately in a longitudinal direction and an arcuate direction between the closed position and the open position.

5. The microwave cooking appliance of claim 1 wherein the front opening is defined by an outer periphery, wherein the door seals against the outer periphery, and wherein the bottom includes a portion of the outer periphery, wherein the portion of the outer periphery travels with the bottom between the closed position and the open position.

6. A microwave cooking appliance comprising:

a housing having a bottom opening and a front opening, wherein the front opening is adjacent a front side of the housing;

a door positionable between a closed position and an open position relative to the front opening;

a bottom positionable between a closed position and an open position relative to the bottom opening;

an actuator;

a plurality of linkage members coupling the actuator to the bottom, wherein the actuator articulates the plurality of linkage members from a stowed position to a deployed position, wherein when in the stowed position the bottom is in the closed position and when in the deployed position the bottom is in the open position;

a linkage track guiding the plurality of linkage members between the stowed position and the deployed position to position the bottom from the closed position down and towards the front side of the housing to the open position; and wherein the linkage track includes a first slot and a second slot, wherein the first slot is substantially linear and the second slot includes an arcuate portion.

7. The microwave cooking appliance of claim 6 wherein the plurality of linkage members includes a first linkage member having an upper end and a lower end, wherein the upper end includes a first pin slideably and rotatably engaging the first slot and a second pin slideably and rotatably engaging the second slot, and wherein the lower end includes a third pin rotatably engaging the bottom.

8. The microwave cooking appliance of claim 7 wherein the first linkage member includes an arcuate shape from the upper end towards the lower end, wherein the first linkage is concave adjacent the front side of the housing.

9. The microwave cooking appliance of claim 7 wherein the first linkage member pivots about the first pin when the first pin engages a lower end of the first slot and the second pin slides in the arcuate portion of the second slot.

10. The microwave cooking appliance of claim 6 wherein the first slot is more proximal to the front side than the second slot, and wherein the arcuate portion of the second slot extends below a lower end of the first slot.

11. The microwave cooking appliance of claim 6 wherein the actuator is a track actuator having a pivoting end attached to the housing and an attachment end pivotably attached to a linkage member of the plurality of linkage members, wherein the attachment end linearly moves relative to the pivoting end when the plurality of linkage members articulate between the stowed position and the deployed position.

12. The microwave cooking appliance of claim 6 wherein when the door is in the closed position the door overlaps a front edge of the bottom when the bottom is in the closed position.

13. A microwave cooking appliance comprising:

a housing having a bottom opening and a front opening, wherein the front opening is adjacent a front side of the housing;

a door positionable between a closed position and an open position relative to the front opening;

a bottom positionable between a closed position and an open position relative to the bottom opening;

a first seal positioned between the bottom and the housing when the bottom is in the closed position; and a second seal positioned between the door and the bottom when the bottom is in the closed position and the door is in the closed position.

14. The microwave cooking appliance of claim 13 wherein the first seal is a gasket sealing a portion of a periphery of the bottom and the second seal is a choke groove of the door sealing a remaining portion of the periphery of the bottom.

15. The microwave cooking appliance of claim 13 wherein the front opening is defined by an outer periphery, wherein the second seal seals against the outer periphery, and wherein the bottom includes a portion of the outer periphery, wherein the portion of the outer periphery travels with the bottom between the closed position and the open position.

16. The microwave cooking appliance of claim 13 wherein at least a portion of the first seal remains with the housing when the bottom travels between the closed position and the open position.

17. The microwave cooking appliance of claim 13 wherein the second seal travels with the door between the closed position and the open position.

18. A microwave cooking appliance comprising:

a housing having a cooking cavity, wherein the housing includes a front opening and a bottom opening;

a door, wherein the door is movable between a closed position closing the front opening to define a portion of the cooking cavity and an open position different from the closed position;

a bottom, wherein the bottom is movable between a closed position closing the bottom opening to define a portion of the cooking cavity and an open position different from the closed position, wherein the bottom moves from the closed position downwardly away from the bottom opening and outwardly in front of the front opening of the housing to the open position; and wherein the front opening is defined by an outer periphery, wherein the door seals against the outer periphery, and wherein the bottom includes a portion of the outer periphery, wherein the portion of the outer periphery travels with the bottom between the closed position and the open position.

19. The microwave cooking appliance of claim 18 further comprising a plurality of linkage members coupling the bottom to an actuator, wherein the actuator articulates the plurality of linkage members from a stowed position to a deployed position, wherein when in the stowed position the bottom is in the closed position and when in the deployed position the bottom is in the open position.

20. The microwave cooking appliance of claim 18 wherein the bottom travels separately in a longitudinal direction and an arcuate direction between the closed position and the open position.

21. A microwave cooking appliance comprising:

a housing having a bottom opening and a front opening, wherein the front opening is adjacent a front side of the housing;

a door positionable between a closed position and an open position relative to the front opening;

a bottom positionable between a closed position and an open position relative to the bottom opening;

an actuator;

a plurality of linkage members coupling the actuator to the bottom, wherein the actuator articulates the plurality of linkage members from a stowed position to a deployed position, wherein when in the stowed position the bottom is in the closed position and when in the deployed position the bottom is in the open position;

a linkage track guiding the plurality of linkage members between the stowed position and the deployed position to position the bottom from the closed position down and towards the front side of the housing to the open position; and wherein the actuator is a track actuator having a pivoting end attached to the housing and an attachment end pivotably attached to a linkage member of the plurality of linkage members, wherein the attachment end linearly moves relative to the pivoting end when the plurality of linkage members articulate between the stowed position and the deployed position.

* * * * *